United States Patent [19]

Thalimer et al.

[11] 3,766,479

[45] Oct. 16, 1973

[54] CARRIER DETECTION CIRCUIT

[75] Inventors: David Arthur Thalimer, Myungsae Son, both of San Diego, Calif.

[73] Assignee: The National Cash Register Company, Dayton, Ohio

[22] Filed: Oct. 4, 1971

[21] Appl. No.: 186,362

[52] U.S. Cl. .................... 325/320, 178/88, 329/104

[51] Int. Cl. .................... H04b 1/16

[58] Field of Search .................. 178/66, 88; 325/30, 325/320, 474, 64; 329/104

[56] References Cited

UNITED STATES PATENTS

| | | | |
|---|---|---|---|
| 3,711,777 | 1/1973 | Tink | 325/64 |
| 3,551,889 | 12/1970 | Miller | 325/320 |
| 3,461,390 | 8/1969 | Mack | 178/88 |

*Primary Examiner*—Albert J. Mayer

*Attorney*—J. T. Cavender et al.

[57] ABSTRACT

A carrier detection circuit for use with a modem receiver wherein noise level on the circuit is compared to the level of carrier to turn on a latch circuit, and turning off the latch circuit is controlled by comparing the output of an automatic gain control circuit responsive to carrier plus noise level to circuit noise level. A time delay in the automatic gain control circuit prevents turn-off due to momentary signal drop-outs.

10 Claims, 1 Drawing Figure

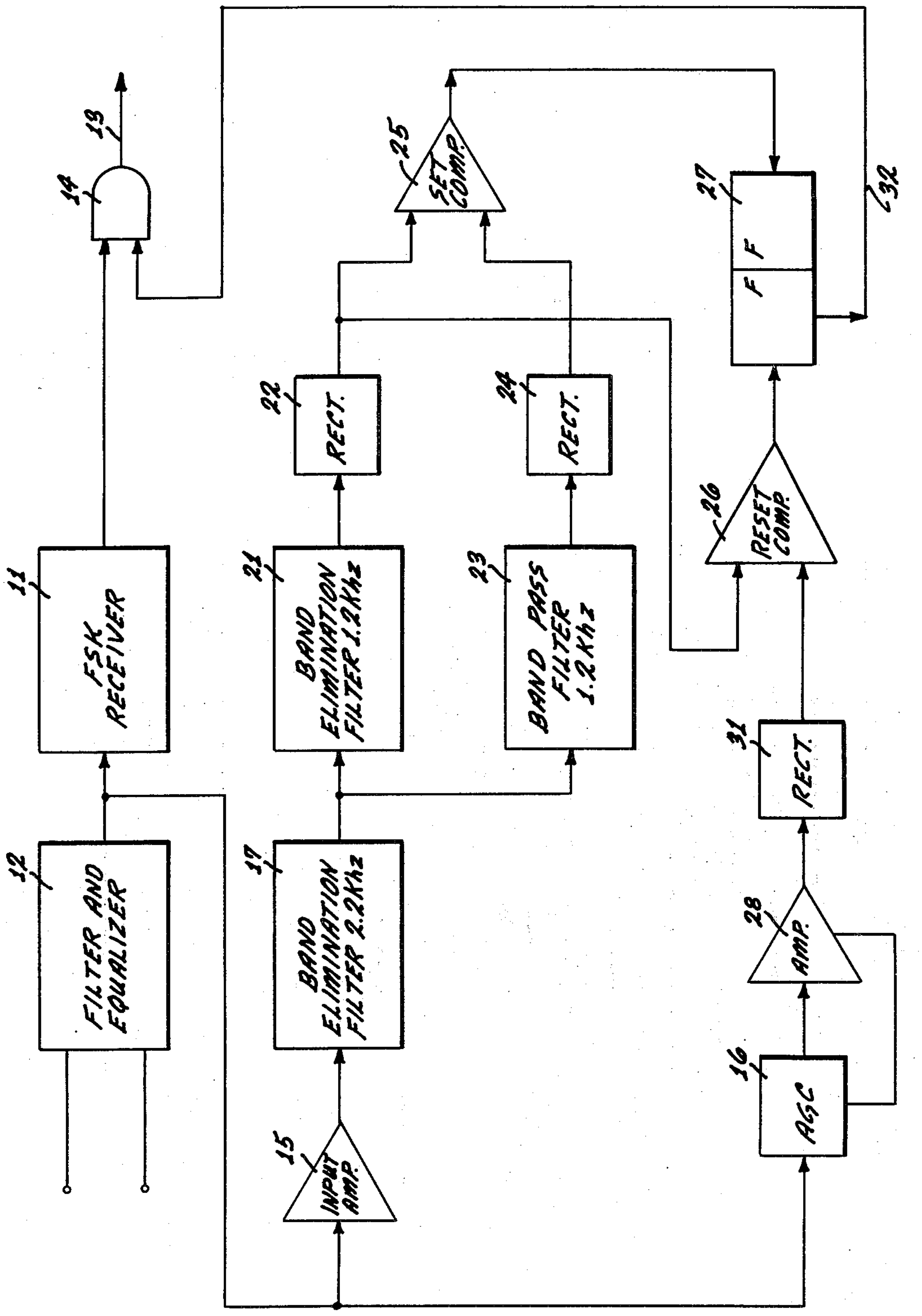
FSK RECEIVER
FILTER AND EQUALIZER
BAND ELIMINATION FILTER 1.2Khz
BAND ELIMINATION FILTER 2.2Khz
BAND PASS FILTER 1.2Khz
RECT.
RECT.
RECT.
SET COMP.
RESET COMP.
F F
AMP.
AGC
INPUT AMP.

CARRIER DETECTION CIRCUIT

SUMMARY OF THE INVENTION

The present invention is directed toward digital data transmission systems employing conventional telephone voice transmission facilities. More particularly, the present invention is directed to a circuit to be employed in connection with a conventional frequency shift keying receiver for swiftly detecting the presence of a data transmission carrier, providing a turn-on signal, and preventing a spurious turn-off signal caused by short bursts of noise while providing a turn-off signal upon the receipt of an end-of-transmission code where speed of turn-off is essential.

A computer and its peripheral devices connect into the ordinary voice wire communication system by means of a transmission control unit, a terminal for generating outgoing information and/or receiving incoming information, and a device for conditioning the signal for transmission over the communications facilities and conditioning an incoming message for acceptance by the terminal. The equipment that conditions the incoming and outgoing signals is known by a variety of terms. It has been called a line adapter, a data set, a modulator, or, as here, a modem, since the device modulates and demodulates the transmitted carrier bearing the digital data signal. The modem modulates a carrier with the digital pulses and converts them into an A.C. representation using frequency shift keying. A 1,200 hertz frequency is usually employed to transmit a "mark" and a 2,200 hertz frequency is employed to transmit a "space". Such transmission may be synchronous or asynchronous. In the present invention, asynchronous, or start-stop transmission is employed, wherein one character is sent at a time, although similar techniques could be applied to synchronous transmission. The character is initialized by a "start" signal in the form of a "space" condition, and terminated by a "stop" signal in the form of a "mark" condition. In the present invention, a logic one voltage level is provided at the output when a "mark" signal frequency of 1,200 hertz is received, and a logic zero voltage level is present at the output upon receipt of a "space" signal frequency of 2,200 hertz.

The present invention provides a carrier detection circuit to detect the transmission of carrier frequencies on the transmission line from a remote data set. There is a delay, typically 50 milliseconds, before such circuits can distinguish the presence of carrier frequencies in the presence of a high noise level on the transmission line. Some of the delay is due to the employment heretofore of the same broad band circuitry to detect the turn-on and turn-off of the carrier frequencies, since broad band circuits have a relatively low signal to noise ratio. The low signal to noise ratio requires that the detection of the carrier be delayed until the presence of the signal can be substantiated by being detected over the noise for a period of time.

In the present invention, the time necessary for detection of a carrier signal is reduced considerably, thereby substantially increasing operating speed. The increased operating speed without an attendant increased susceptibility to noise is primarily due to the provision of a circuit comparing the mark signal with line noise. The mark signals have a relatively high signal to noise ratio, thereby enabling fast reliable detection of a carrier at the mark frequency. The narrow band of detection avoids false turn-ons due to noise. After detection of a carrier, the higher frequency, and usually lower energy space signals are present as well as the mark frequency during the duration of the message. To quickly detect the turn-off of the carrier while decreasing susceptibility to noise, a novel carrier detection circuit is disclosed.

Since carrier detect and turn-on detection can take place with each transmitted character in the case of short messages, it will be readily apparent that a substantial saving of time for detection of the beginning and end of transmission of a character enables closer spacing of characters and faster operation, particularly in the presence of noise. Typically in the present invention, the carrier detect and turn-on of the gate passing the data to the utilization apparatus may be less than 10 milliseconds. The same delay time is employed to reduce frequency of turn-offs due to noise received during the message. Noise turn-offs may be reduced to less than one-half those normally found with one type of turn-off and may be reduced to zero by the use of an EOT signal.

A carrier detect flip-flop is latched upon reception of the high energy initial mark signals that always occur at the beginning of the message, and a suitable turn-off signal is generated to reduce the probability of a turn-off by nosie during the message. Turn-off signals due to noise or loss of carrier are limited by an automatic gain control circuit having a threshold adjusted so that normal turn-off is rapid but spurious turn-offs are reduced. A message end code can cause rapid turn-off if it is transmitted and spurious turn-offs are avoided as completely as possible. A "mark" in the received signal must be available before fast-turn-offs are allowed, thereby reducing the probability of turn-off due to noise. It is conventional to enable the FSK receiver to be in the mark state at the cessation of carrier, thereby assuring a turn-off at the end of message. Noise level is compared with the level of the mark frequency carrier. If mark signals are present at a useable level, the latch is set. The noise level is also compared with the level of signal plus noise, which is held between predetermined limits by the automatic gain control circuit. The outputs of a first comparator responsive to noise level and mark signal level, and of a second comparator responsive to the controlled noise plus signal level and noise level are applied to the set and reset inputs of the latch, conveniently a flip-flop, which in turn controls a gate between the receiver and utilization equipment.

BRIEF DESCRIPTION OF DRAWING

The sole FIGURE is a block diagram of a presently preferred embodiment of the present invention.

DESCRIPTION OF THE INVENTION

A conventional frequency shift key receiver 11 is connected to a telephone line through a band pass filter and equalizer 12. The mark and space signals derived from the frequency shift key receiver 11 are applied to utilization apparatus on an output line 13 through an AND gate 14. The voice frequency signals from filter and equalizer 12 are also applied to an input amplifier 15, and to automatic gain control circuit 16. The amplified voice frequency signals from input amplifier 15 applied to band elimination filter 17. The band elimination filter 17 is tuned to attenuate the 2.2 kilohertz space signal frequency. The resulting signal is then applied to a band elimination filter 21, tuned to attenuate the 1.2 kilohertz mark signal. The output from band elimination filter 21, therefore, contains only the noise voltage present within the telephone voice frequency pass band, since the mark and space signals have been attenuated. The remaining noise signal is rectified by rectifier 22, providing a DC level proportional to noise.

The output of band elimination filter 17, which contains both the noise voltage and the 1.2 kilohertz mark signal is applied to a band pass filter 23, which passes only the 1.2 kilohertz mark signal, eliminating the noise. The mark signal is applied to rectifier 24, resulting in a unidirectional signal proportional to the mark signal level. Both the rectified noise voltage from rectifier 22 and the unidirectional voltage proportional to the 1.2 kilohertz mark signal from rectifier 24 are applied to the inputs of a voltage comparator 25. The voltage proportional to noise level from rectifier 22 is also applied to one input of reset comparator 26. An automatic gain controlled circuit 16, having a preset output level, provides a predetermined level line signal to amplifier 28. The amplified output is rectified by rectifier 31, providing a DC voltage when a signal is present. The regulation properties of the AGC circuit 16 enable storage of a voltage representing gain level due to signal plus noise present on the line. This voltage, dependent upon line signal conditions prior to carrier turn-off, has a lag of about 15 milliseconds. The automatic gain controlled DC voltage level from rectifier 31 is applied to the second input of comparator 26. Flip-flop 27 has a set terminal connected to the output of set comparator 25, and a reset terminal connected to the output of reset comparator 26. A conductor 32 connects one side of flip-flop 27 to the second terminal of gate 14.

Applied to the input of set comparator 25 is a signal representing the noise level from rectifier 22 and a signal representing the mark signal level from rectifier 24. Prior to the time the 1.2 kilohertz mark carrier appears on the line, the comparator output is held high by the noise input. Since the noise level across the entire voice phone line band width is substantially white, or Gaussian noise, the rectified and filtered noise at both inputs of comparator 26 has a low probability of exceeding the AGC voltage and generating a false turn-on signal. When a mark carrier at 1.2 kilohertz is applied to the line, it affects only the signal side of the set comparator 25. This is due to the presence of band pass filter 23 on the signal side and the band elimination filters 17 and 21 on the noise side. Therefore, the output of comparator 25 goes from high to low, and flip-flop 27 is set. Upon the receipt of a frequency shift keyed signal, flip-flop 27 receives a set signal when there is sufficient energy at the mark frequency in the received FSK signal.

Flip-flop 27 is reset when the carrier level drops for a period longer than 15 milliseconds. When the rectified signal level output of the automatic gain control circuit 16 falls below a preset value at the input of reset comparator 26 for a period of 15 milliseconds, the reset comparator 26 changes state, resetting flip-flop 27. The AGC voltage applied to comparator 26 is compared in comparator 26 with the noise level voltage from rectifier 22. When the data carriers are turned off, the voltage level from the AGC channel decreases with respect to the noise level input to comparator 26. The output of comparator 26 decreases, resetting the flip-flop 27, and causing the output on line 32 to go low, thereby closing gate 14 and preventing spurious noise on line 13 from affecting the utilization equipment.

What is claimed is:

1. A frequency shift keyed receiver having a carrier detection circuit for detecting the presence of a received signal, said carrier detection circuit comprising:

A. a carrier detect latch circuit;
B. first comparing means for setting said latch circuit, said first comparing means including:
   1. first filter means responsive to received signals for eliminating carrier energy from said received signals leaving line noise,
   2. second filter means passing only mark frequency energy in the received signal, and
   3. a first comparator connected to the respective outputs of said first and second filter means; and
C. second comparing means for resetting said latch circuit.

2. In the carrier detection circuit of claim 1, said second comparing means including:

automatic gain control means responsive to received signals; and a second comparator connected to said automatic gain control means and to said first filter means.

3. In the carrier detection circuit of claim 2, connecting means connecting said first comparing means and said second comparing means to said carrier detect latch circuit.

4. In a carrier detection circuit for use in connection with a frequency shift keyed receiver, the combination of:

A. a carrier detect latch circuit, said carrier detect latch circuit including:
   1. a bistable circuit having a set terminal, a reset terminal, and an output terminal; and
   2. a gate circuit having a first input connected to the frequency shift keyed receiver, a second input connected to said output of said bistable circuit, and an output terminal;
B. first filter means adapted to be connected to received signals for eliminating frequency shift keyed signals;
C. second filter means adapted to be connected to received signals for passing mark signals;
D. a first comparator in circuit with said first and second filter means;
E. signal level responsive means adapted to be connected to received signals;
F. second comparator means in circuit with said first filter means and said signal level responsive means; and
G. means interconnecting said first and second comparator means with said carrier detect latch circuit.

5. In the carrier detection circuit of claim 4, said first filter means including:

a first band elimination filter tuned to reject the space frequency; and a second band elimination filter tuned to reject the mark frequency.

6. In the carrier detection circuit of claim 5, said second band elimination filter being connected in series relation with said first band elimination filter.

7. In the carrier detection circuit of claim 6, said second filter means including a band pass filter tuned to pass the mark frequency connected in series relation with said first band elimination filter.

8. In the carrier detection circuit of claim 7, said first comparator means including:

first rectifying means connected to said second band elimination filter to provide a direct voltage proportional to noise;

second rectifying means connected to said band pass filter to provide a direct voltage proportional to mark signals; and a first voltage comparator connected to said first and second rectifiers to provide an output voltage proportional to the mark signal to noise ratio to the set terminal of said bi-stable circuit.

9. In the carrier detection circuit of claim 8, said signal level responsive means including an automatic gain control circuit.

10. In the carrier detection circuit of claim 9, said second comparator means including:

a third rectifying means connected to said automatic gain control circuit to provide a voltage proportional to received signal; and a second voltage comparator connected to said first rectifying means and said third rectifying means to provide an output voltage proportional to the signal to noise ratio to the reset terminal of said bistable circuit.

* * * * *